Patented May 1, 1934

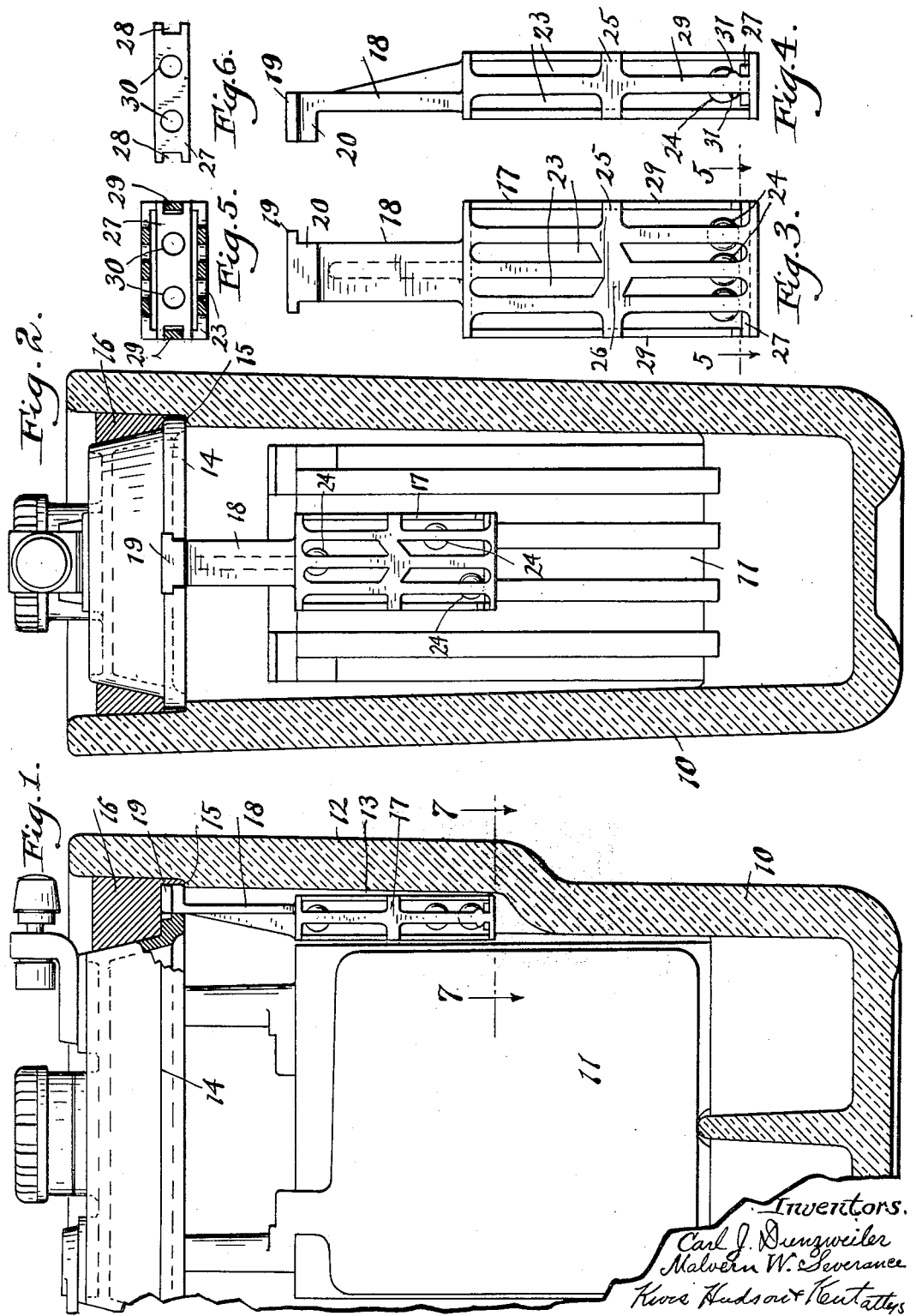

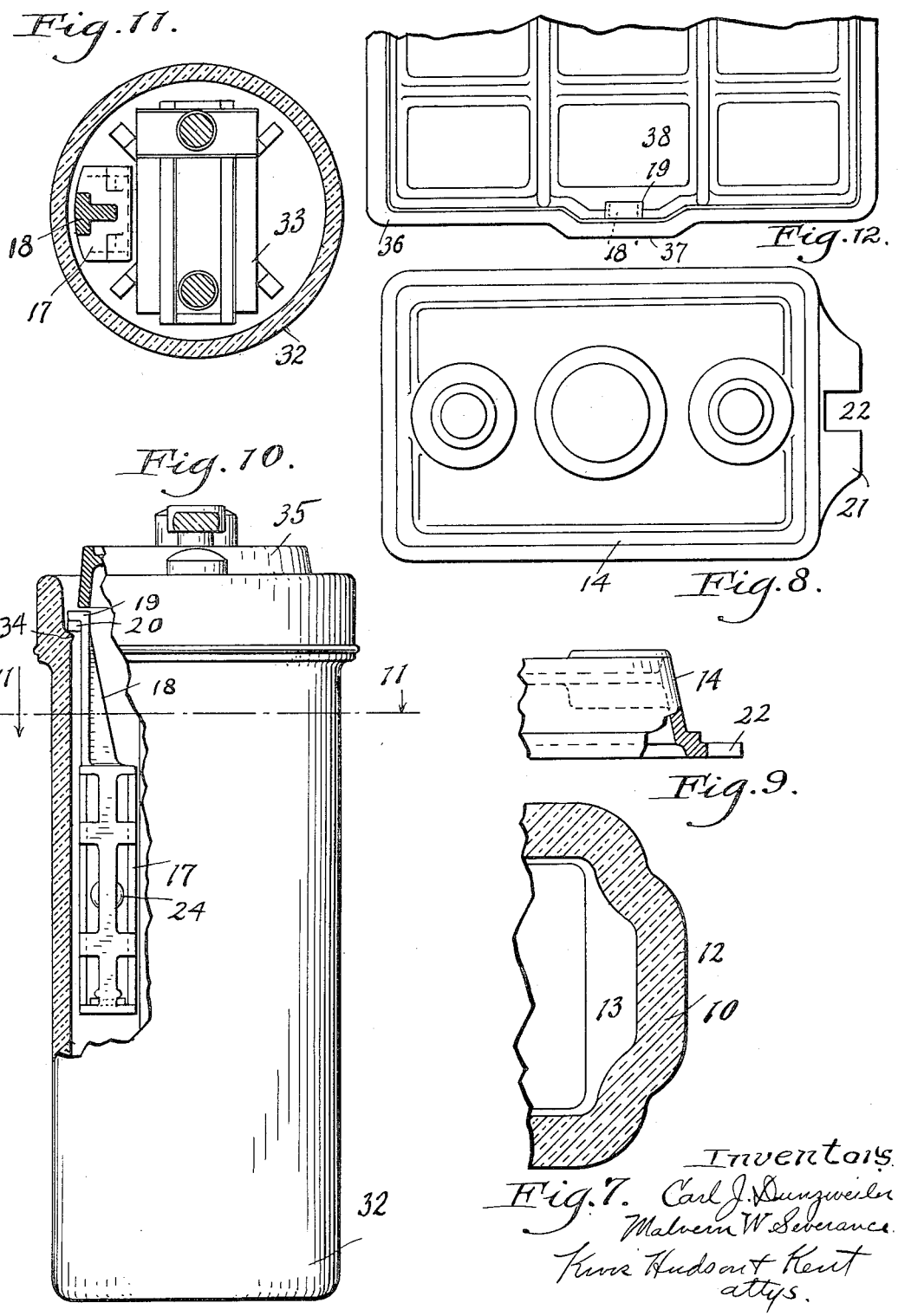

1,956,984

UNITED STATES PATENT OFFICE 1,956,984

SPECIFIC GRAVITY INDICATOR

Carl J. Dunzweiler and Malvern W. Severance, Cleveland, Ohio, assignors to Willard Storage Battery Company, Cleveland, Ohio, a corporation of West Virginia Application March 27, 1931, Serial No. 525,686

3 Claims. (Cl. 136—182)

This invention relates to improvements in gravity indicators for storage batteries.

One of the objects of the invention is the provision of an indicator of this character wherein the balls or other hydrometric units are mounted in a cage which entirely surrounds them, so that the indicator may be fully assembled outside of the battery.

Another object is the provision of means for suspending the indicator from a battery cell cover or from an internal shoulder in the battery container, or by a combination of both.

Other objects and features of novelty will appear as we proceed with the description of that embodiment of the invention which, for the purposes of the present application, we have illustrated in the accompanying drawings, in which Figure 1 is a vertical sectional view of one cell of a storage battery embodying my invention.

Fig. 2 is a transverse elevation of the same with the end wall of the container removed.

Fig. 3 is a front elevation of the gravity indicator.

Fig. 4 is a side elevation of the same.

Fig. 5 is a horizontal section taken substantially on the line 5—5 of Fig. 3.

Fig. 6 is a detail plan view of a bottom plate which may be employed to close the cage after the balls or other hydrometric units are in place.

Fig. 7 is a detail sectional view taken substantially on the line 7—7 of Fig. 1.

Fig. 8 is a plan view of the cell cover shown in Fig. 1.

Fig. 9 is a fragmental elevation of the cell cover with parts shown in section.

Fig. 10 is an elevational view, partly in vertical section, showing the application of the invention to a different form of battery.

Fig. 11 is a horizontal sectional view of the same taken substantially on the line 11—11 of Fig. 10, and Fig. 12 is a fragmental plan view of a multi-cell storage battery showing my gravity indicator positioned at one side of a cell rather than at one end thereof.

Similar reference characters refer to like parts throughout the views.

Referring now to that form of the invention shown in Figs. 1 to 9, inclusive, 10 is a battery container molded preferably of glass and containing a battery element 11. If the container is not made of transparent material, it must of course contain a transparent window in order that the indicator may be observed. In one of the walls of the container adjacent the edges of the plates and separators of the element 11, there is a bulge 12, which extends from the top of the container well below the liquid level of the battery. This bulge provides a pocket 13 between the cell wall and the battery element 11. Although the illustrated arrangement is preferred, the bulge 12 may, if desired, extend all the way down to the bottom of the container. Also, in a broader aspect of the invention the necessary space for the indicator may be provided by merely increasing one of the horizontal dimensions of the container. A cell cover 14 is supported within the container 10 by suitable means, as for instance a shoulder 15 on the inner wall of the container, and after assembly the joint between the container and cover is sealed by a suitable sealing compound 16.

The indicator cage 17, which may be of hard rubber or other material capable of resisting the action of the acid in the battery solution, is positioned within the pocket 13. While it may be merely slipped into the pocket 13 and retained there by the battery element 11, we prefer to suspend the cage from above, as for instance from the cover 14. This may be done by molding upon or attaching to the upper end of the cage a hanger 18 having a laterally extending head 19 and a reenforcing fillet 20 of the same width as the shank of the hanger. The cover 14 has an extension 21 formed to overlie the pocket 13 and meet the wall of the container at the bulge 12, and in this extension there is a slot 22 of the same width as the shank of the hanger 18. Consequently the hanger may be caused to enter the slot 22 laterally before the cover is assembled in the battery, whereupon the laterally extending portions of the head 19 will overlie the extension 21 and the hanger will be suspended in this manner. The fillet 20 assists in guiding the hanger into the slot 22, and by its engagement with the sides of that slot serves to prevent the indicator from turning horizontally. While we prefer to have the head overlie an extension of the cover, obviously it could just as well overlie the shoulder 15 on the container, the part 20 serving to fill up the slot, or in fact the extension of the cover may be omitted and the head of the hanger made large enough to take the place of the extension as a closure for the top of space 13.

The cage 17 is preferably more or less open all around so that the circulation of liquid through it may be relatively free. In the form illustrated the side walls have a series of vertical slots 23 of less width than the diameter of the hydrometric balls 24. As the cage is relatively long it is desirable to provide a horizontal connecting bar 25 at an intermediate point. Preferably this bar includes on the front wall of the cage two portions 26 which are inclined, thereby rendering balls floating behind them visible to some extent at all times.

The cage 17, as manufactured, must be provided with some opening through which the balls 24 may be inserted at assembly. For this purpose we prefer to leave the bottom end of the cage unclosed and to provide a bottom plate 27, having end notches 28 to fit around the vertcal bars 29 of the side walls of the cage. This plate is supplied preferably with openings 30 through which the liquid may circulate. When the balls are in place the plate 27 is distorted sufficiently to get it between the bars 29. When in position so that the notches 28 come opposite the bars 29 the plate may be caused or permitted to assume its original flat condition. The bars 29 may have bosses 31 thereon, see Fig. 4, which prevent the plate from being slid into the cage beyond its proper position. The plate 27 may be formed of lead or it may be made of hard rubber having sufficient resiliency to enable the plate to be snapped into place.

In Figs. 10 and 11 we have shown our gravity indicator applied to a single cell battery in a round glass container 32. The battery element, shown at 33, has flat sides. Our indicator 17 is positioned in one of the spaces left between the battery element and the container 32. Hence it lies parallel with the sides of the plates and separators, instead of at right angles thereto as in the previously described form. In this case the fillet 20 is caused to rest upon a shoulder 34 near the top of the container, which shoulder also serves as a support for the cell cover 35. The latter is cut out to receive the hanger, and hold it against movement along the shoulder 34.

In Fig. 12 we have illustrated a multi-cell storage battery having a container 36 provided with a bulge 27 in one of its side walls opposite the side rather than the end of a cell 38. The cover of this cell is provided with a slot like the slot 22 previously referred to, in order to receive the hanger 18 and support the head 19 thereof. Of course it will be understood that our indicator may be applied to more than one of the cells of a multi-cell battery or to all of the cells if desired.

In the foregoing description we have necessarily gone somewhat into detail in order to explain fully the particular embodiments of the invention herein illustrated, but we desire it to be understood that such detail disclosures are not to be construed as amounting to limitations, except as they may be included in the appended claims.

Having thus described our invention, we claim:

1. In combination, a battery container, a cage provided with openings in the side thereof supported in said container so as to extend below the normal liquid level of said battery, a hydrometric unit in said cage visible through the side of said container, said cage forming a closure for said hydrometric unit independent of the side walls of said container, a cover for said container having a drop flange adjacent the side walls of said container, a hanger extending from said cage, said cover having a slot in the drop flange thereof opening into the side thereof for the reception of said hanger, means on the upper end of said hanger extending through said slot and engaging the cover for suspending said cage, and sealing compound between said cover and the side walls of said container above said drop flange.

2. In combination, a battery container, a cage provided with openings in the side thereof and supported in said container so as to extend below the normal liquid level of said battery, a hydrometric unit in said cage visible through the side of said container, said cage forming a closure for said hydrometric unit independent of the side walls of said container, a cover for said container having a drop flange extending adjacent the side wall of the container to provide a sealing groove, a hanger extending from said cage and connected to the drop flange of said cover for suspending said cage, said hanger having a connecting portion engaging said drop flange and lying substantially at the bottom of said groove, and sealing compound in said groove engaging and covering said connecting portion.

3. In combination, a battery container, a cage provided with openings in the side thereof and supported in said container so as to extend below the normal liquid level of said battery, a hydrometric unit in said cage visible through the side of said container, said cage forming a closure for said hydrometric unit, a cover for said container having a drop flange extending adjacent the side wall of the container to provide a sealing groove, a hanger extending from said cage and connected to the drop flange of said cover for suspending the cage from said flange, said hanger having a connecting portion engaging said drop flange and lying substantially at the bottom of said groove, and sealing compound in said groove engaging and covering said connecting portion whereby the latter is retained in place with respect to the drop flange and container wall.

CARL J. DUNZWEILER.
MALVERN W. SEVERANCE.